(12) United States Patent
Niessner et al.

(10) Patent No.: US 11,870,222 B2
(45) Date of Patent: Jan. 9, 2024

(54) SPARK PLUG ELECTRODE AND METHOD OF MANUFACTURING THE SAME

(71) Applicant: FEDERAL-MOGUL IGNITION GMBH, Neuhaus-Schierschnitz (DE)

(72) Inventors: Werner Niessner, Steinheim (DE); Daniel Konig, Rodental (DE)

(73) Assignee: FEDERAL-MOGUL IGNITION GMBH, Neuhaus-Schierschnitz (DE)

( * ) Notice: Subject to any disclaimer, the term of this patent is extended or adjusted under 35 U.S.C. 154(b) by 0 days.

(21) Appl. No.: 17/736,594

(22) Filed: May 4, 2022

(65) Prior Publication Data
US 2022/0360053 A1 Nov. 10, 2022

Related U.S. Application Data

(60) Provisional application No. 63/183,762, filed on May 4, 2021.

(51) Int. Cl.
*H01T 13/39* (2006.01)
*H01T 21/02* (2006.01)

(52) U.S. Cl.
CPC .............. *H01T 13/39* (2013.01); *H01T 21/02* (2013.01)

(58) Field of Classification Search
CPC .......... H01T 13/39; H01T 13/32; H01T 13/20
See application file for complete search history.

(56) References Cited

U.S. PATENT DOCUMENTS

| | | | |
|---|---|---|---|
| 6,621,198 B2 | 9/2003 | Kanao et al. | |
| 7,385,339 B2 | 6/2008 | Lineton et al. | |
| 7,385,355 B2 | 6/2008 | Kusunoki et al. | |
| 7,569,979 B2 | 8/2009 | Lykowsi et al. | |
| 7,666,047 B2 | 2/2010 | Suzuki et al. | |
| 7,795,790 B2 | 9/2010 | Lineton | |
| 9,739,192 B2 | 8/2017 | Willi | |
| 9,800,023 B2 | 10/2017 | Niessner et al. | |
| 9,806,500 B2 | 10/2017 | Sakairi et al. | |
| 9,843,045 B2 | 12/2017 | Yuge et al. | |
| 9,853,423 B1 | 12/2017 | Sumoyama et al. | |

(Continued)

FOREIGN PATENT DOCUMENTS

| | | |
|---|---|---|
| CN | 103094842 A | 5/2013 |
| CN | 103457160 A | 12/2013 |

(Continued)

OTHER PUBLICATIONS

CZ-306282-B6, machine English Translation retrieved from Espacenet.com (Year: 2016).*

(Continued)

*Primary Examiner* — Mariceli Santiago
(74) *Attorney, Agent, or Firm* — Reising Ethington PC

(57) ABSTRACT

A spark plug electrode with an electrode tip formed on an electrode base using an additive manufacturing process, such as a powder bed fusion technique. The spark plug electrode includes an intermediate layer located between the electrode tip and the electrode base, where the intermediate layer has a coefficient of thermal expansion (CTE) that is between that of the electrode base and the electrode tip and includes a whole area connection. In some examples, the whole area connection is non-uniform in thickness so that it is thicker in one section than it is in another section.

14 Claims, 7 Drawing Sheets

(56) References Cited

U.S. PATENT DOCUMENTS

| | | |
|---|---|---|
| 10,415,122 B2 | 9/2019 | Barthelemy et al. |
| 10,744,590 B2 | 8/2020 | Maier et al. |
| 10,897,123 B2 | 1/2021 | Abe |
| 10,913,257 B2 | 2/2021 | Coupland et al. |
| 11,189,993 B2 | 11/2021 | Grabner et al. |
| 2004/0100178 A1* | 5/2004 | Kanao .................. H01T 13/39 313/141 |
| 2004/0140745 A1 | 7/2004 | Hrastnik |
| 2006/0028106 A1 | 2/2006 | Lineton |
| 2012/0194056 A1 | 8/2012 | Ma |
| 2013/0313960 A1 | 11/2013 | Francesconi |
| 2014/0049151 A1 | 2/2014 | Murayama et al. |
| 2014/0170598 A1 | 6/2014 | Abend |
| 2015/0223869 A1 | 8/2015 | Mayer et al. |
| 2016/0003150 A1 | 1/2016 | DiCintio et al. |
| 2017/0040917 A1 | 2/2017 | Chang et al. |
| 2017/0062798 A1 | 3/2017 | Wang et al. |
| 2017/0107946 A1 | 4/2017 | Le Cras et al. |
| 2017/0167357 A1 | 6/2017 | Maier |
| 2017/0167358 A1 | 6/2017 | Maier et al. |
| 2017/0179472 A1 | 6/2017 | Allie et al. |
| 2017/0252854 A1 | 9/2017 | Maier et al. |
| 2017/0253536 A1 | 9/2017 | Danforth et al. |
| 2017/0331260 A1 | 11/2017 | Quest et al. |
| 2017/0350590 A1 | 12/2017 | Choudhri et al. |
| 2018/0366918 A1 | 12/2018 | Sumoyama et al. |
| 2019/0366585 A1 | 12/2019 | Nagai et al. |
| 2020/0021084 A1 | 1/2020 | Kimura |
| 2021/0086279 A1 | 3/2021 | Clover et al. |
| 2021/0273417 A1 | 9/2021 | Ritter et al. |
| 2022/0059999 A1* | 2/2022 | Ritsema .................. H01T 13/39 |

FOREIGN PATENT DOCUMENTS

| | | |
|---|---|---|
| CN | 203387050 U | 1/2014 |
| CN | 104923797 A | 9/2015 |
| CN | 106735273 A | 5/2017 |
| CN | 106881509 A | 6/2017 |
| CN | 107891200 A | 4/2018 |
| CN | 109332694 A | 2/2019 |
| CN | 110899695 A | 3/2020 |
| CZ | 2013291 A3 * | 12/2014 |
| CZ | 306282 B6 * | 11/2016 |
| DE | 102012223239 A1 | 6/2014 |
| DE | 102016209094 A1 | 11/2017 |
| DE | 102017221136 A1 | 5/2019 |
| DE | 102017221137 A1 | 5/2019 |
| DE | 102018212894 A1 | 2/2020 |
| EP | 2727898 A1 | 5/2014 |
| EP | 3263524 A1 | 1/2018 |
| FR | 3095149 A1 | 10/2020 |
| GB | 2544465 A | 5/2017 |
| JP | 2002359053 A | 12/2002 |
| JP | 2009270130 A | 11/2009 |
| KR | 100400101 B1 | 9/2003 |
| WO | WO9807220 A1 | 2/1998 |
| WO | 2005025783 A1 | 3/2005 |
| WO | WO2006017687 A2 | 2/2006 |
| WO | 2013128416 A2 | 9/2013 |
| WO | 2015173790 A1 | 11/2015 |
| WO | WO2016116385 A1 | 7/2016 |
| WO | WO2016156973 A1 | 10/2016 |
| WO | WO2017143961 A1 | 8/2017 |
| WO | WO2017221010 A1 | 12/2017 |
| WO | WO2021253061 A1 | 12/2021 |
| WO | WO2022040544 A1 | 2/2022 |

OTHER PUBLICATIONS

CZ-2013291-A3, machine English translation retrieved from Espacenet.com (Year: 2014).*

US 10,576,577, 6/2007, Didier Le Breis (withdrawn)

Pavel Krakhmalev et a.; Microstructure, Solidification Texture, and Thermal Stability of 316 L Stainless Steel Manufactured by Laser Powder Bed Fusion; MDPI Journal; Aug. 15, 2018.

International Search Report and Written Opinion issued for PCT/IB2022/054137 dated Aug. 16, 2022.

* cited by examiner

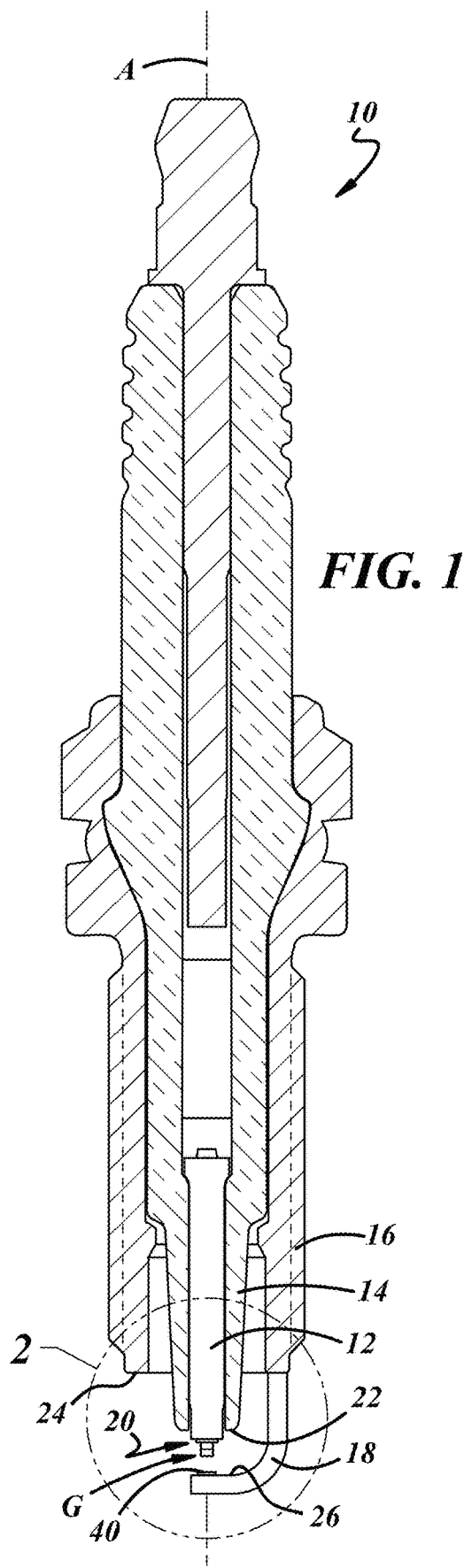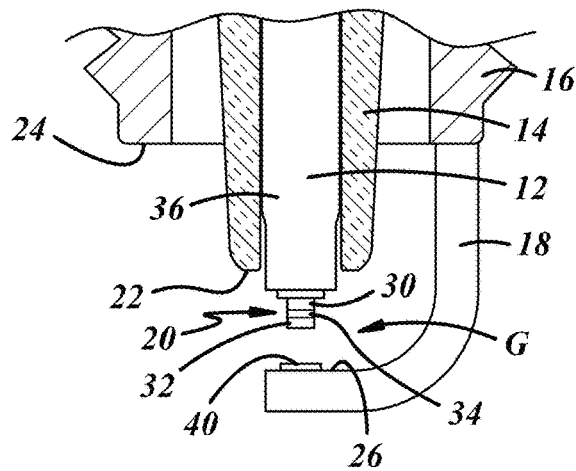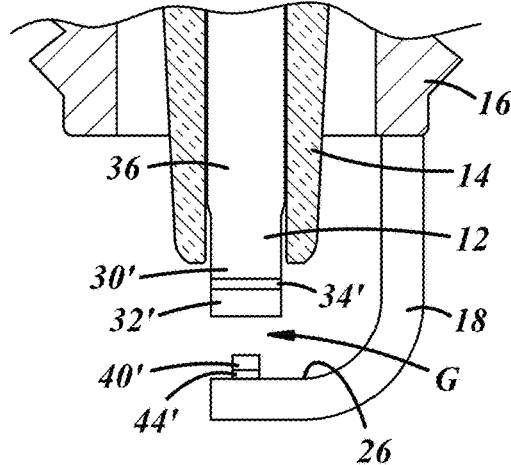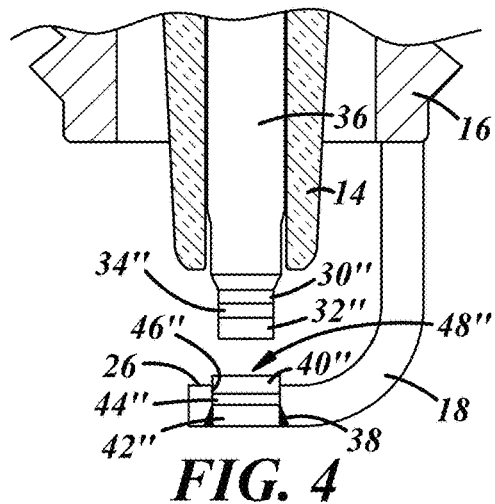
FIG. 1
FIG. 2
FIG. 3
FIG. 4

SPARK PLUG ELECTRODE AND METHOD OF MANUFACTURING THE SAME

RELATED APPLICATIONS

This application claims the benefit of U.S. Provisional Application No. 63/183,762, filed May 4, 2021, the entire contents of which are herein incorporated by reference.

FIELD

The present invention generally relates to spark plugs and other ignition devices and, in particular, to spark plug electrodes and other components that are made using additive manufacturing processes.

BACKGROUND

Spark plugs are used to initiate combustion in internal combustion engines. Typically, spark plugs ignite an air/fuel mixture in a combustion chamber so that a spark is produced across a spark gap between two or more electrodes. The ignition of the air/fuel mixture by means of the spark triggers a combustion reaction in the combustion chamber, which is responsible for the power stroke of the engine. The high temperatures, the high electrical voltages, the rapid repetition of combustion reactions, and the presence of corrosive materials in the combustion gases can create a harsh environment in which the spark plug must function. The harsh environment can contribute to an erosion and/or corrosion of the electrodes, which can negatively affect the performance of the spark plug over time.

To reduce erosion and/or corrosion of the electrodes, various kinds of precious metals and alloys have been used, such as those having platinum and iridium. These materials are expensive, however. Consequently, the manufacturers of spark plugs try to minimize the quantity of precious metals used in an electrode. One approach involves using precious metals only on an electrode tip or on a sparking section of the electrodes, i.e., in the place where a spark jumps across the spark gap, as opposed to the entire electrode body itself.

Various joining techniques, such as resistance and laser welding, have been used for attaching a precious metal electrode tip to an electrode body. However, when a precious metal electrode tip is joined to an electrode body, such as a body made from a nickel alloy, there can be a substantial amount of thermal and/or other stresses on the joint during operation due to the different properties of the materials (e.g., different coefficients of thermal expansion, different melting temperatures, etc.). These stresses, in turn, can undesirably lead to cracking or other damage to the electrode body, the electrode tip, the joint connecting the two components, or a combination thereof.

SUMMARY

According to one embodiment, there is provided a spark plug electrode, comprising: an electrode base; an electrode tip that is formed on the electrode base and includes a precious metal-based material and a plurality of laser deposition layers, the laser deposition layers are stacked on one another; and an intermediate layer that is located between the electrode base and the electrode tip, wherein the intermediate layer has a coefficient of thermal expansion (CTE) that is between that of the electrode base and the electrode tip.

In accordance with various embodiments, the spark plug electrode may have any one or more of the following features, either singly or in any technically feasible combination:

the spark plug electrode is a center electrode and further comprises an electrode body, the electrode base is an integral part of the electrode body such that no hard boundary exists between the electrode base and the electrode body, the intermediate layer and the electrode tip are formed on the electrode base via additive manufacturing such that an interfused boundary exists between the electrode tip and the electrode base, and the spark plug electrode does not include a welded joint between substantially dissimilar materials;

the spark plug electrode is a center electrode and further comprises an electrode body, the electrode base is a separate component from the electrode body and is welded to the electrode body such that a hard boundary exists between the electrode base and the electrode body, the intermediate layer and the electrode tip are formed on the electrode base via additive manufacturing such that an interfused boundary exists between the electrode tip and the electrode base, and the spark plug electrode does not include a welded joint between substantially dissimilar materials;

the spark plug electrode is a ground electrode and further comprises an electrode body, the electrode base is an integral part of the electrode body such that no hard boundary exists between the electrode base and the electrode body, the intermediate layer and the electrode tip are formed on the electrode base via additive manufacturing such that an interfused boundary exists between the electrode tip and the electrode base, and the spark plug electrode does not include a welded joint between substantially dissimilar materials;

the spark plug electrode is a ground electrode and further comprises an electrode body with a hole, the electrode base, the electrode tip and the intermediate layer are part of a pre-manufactured ground electrode tip assembly that is attached in the hole, the electrode base is a separate component from the electrode body and is welded to the electrode body such that a hard boundary exists between electrode base and the electrode body, the intermediate layer and the electrode tip are formed on the electrode base via additive manufacturing such that an interfused boundary exists between the electrode tip and the electrode base, and the spark plug electrode does not include a welded joint between substantially dissimilar materials;

the precious metal-based material is selected from the group consisting of: an iridium-based material with a coefficient of thermal expansion that is between $6 \times 10^{-6}$ m/mK and $7 \times 10^{-6}$ m/mK and a melting temperature that is between 2,400° C. and 2,500° C. or a platinum-based material with a coefficient of thermal expansion that is between $8 \times 10^{-6}$ m/mK and $10 \times 10^{-6}$ m/mK and a melting temperature that is between 1,700° C. and 1,800° C.;

the plurality of laser deposition layers have an average layer thickness Y that is between 20 μm and 100 μm and the electrode tip has an electrode tip height X that is between 0.1 mm and 1.0 mm;

the electrode tip includes a plurality of valleys and a plurality of peaks located at one or more interfused boundaries between laser deposition layers;

an average inter-layer surface area of the one or more interfused boundaries is greater than or equal to 1.8× a surface area of the electrode base, before electrode the tip was formed, if the electrode base was perfectly flat;

the intermediate layer includes a whole area connection between the electrode base and the electrode tip, in the whole area connection at least some solidified material from the electrode base has intermixed and/or interfused with at least some solidified material from the electrode tip;

the whole area connection at least covers most of an area or footprint where the electrode tip connects to the electrode base;

the whole area connection is non-uniform in thickness so that it is thicker in one section than it is in another section;

the whole area connection has a lenticular shape and includes a center section and a radially outboard section, the center section is thicker, in an axial dimension, than the radially outboard section and is located towards a center of the whole area connection;

the whole area connection has an uneven shape and includes a first outboard section and a second outboard section, the first outboard section is located on a first side of the whole area connection and is thicker, in an axial dimension, than the second outboard section which is located on a second side of the whole area connection;

the electrode tip includes at least a first segment and a second segment, the first segment is located towards a center of the electrode tip and includes a first plurality of laser deposition layers, the second segment is located radially outboard of the first segment and includes a second plurality of laser deposition layers, the second segment is concentric with the first segment;

the first segment located towards the center of the electrode tip includes a first precious metal-based material and the second segment located radially outboard of the first segment includes a second precious metal-based material, the first precious metal-based material is different than the second precious metal-based material;

the intermediate layer and the electrode tip are formed by additive manufacturing, which uses a powder bed fusion technique to melt or sinter precious metal-based powder onto the electrode base with a laser or electron beam, and then to allow the melted or sintered powder to solidify;

a spark plug, comprising: a shell having an axial bore; an insulator being at least partially located in the shell axial bore and having an axial bore; a center electrode being at least partially located in the insulator axial bore; and a ground electrode attached to the shell; wherein at least one of the center electrode or the ground electrode includes the spark plug electrode of claim 1.

According to another embodiment, there is provided an additive manufacturing process for manufacturing a spark plug electrode, comprising the steps of: providing an electrode base with an end surface; providing powder that includes a precious metal-based material; positioning the electrode base in a tool and covering the end surface with the powder; directing a laser at the end surface of the electrode base such that it melts or sinters at least some of the powder that is covering the electrode base so as to form at least one layer of an intermediate layer, the intermediate layer is formed on the electrode base; covering the intermediate layer with the powder; and directing a laser at the intermediate layer such that it melts or sinters at least some of the powder that is covering the intermediate layer so as to form at least one layer of an electrode tip, the electrode tip is formed on the intermediate layer.

In accordance with various embodiments, the additive manufacturing process may have the following step:

during at least one of the two directing steps, a laser imparts a total amount of energy to a first area that is greater than a total amount of energy imparted to a second area so that a whole area connection between the electrode base and the electrode tip is created with a first section that is thicker than a second section.

DRAWINGS

Preferred embodiments will hereinafter be described in conjunction with the appended drawings, wherein like designations denote like elements, and wherein:

FIG. 1 is a cross-sectional view of a spark plug;

FIG. 2 is a cross-sectional view of the firing end of the spark plug in FIG. 1, where the firing end has an electrode tip that is built onto an electrode base via an additive manufacturing process;

FIGS. 3 and 4 are cross-sectional views of other examples of firing ends of spark plugs, where the firing ends have electrode tips that are built onto electrode bases via additive manufacturing processes;

Figure 14A:
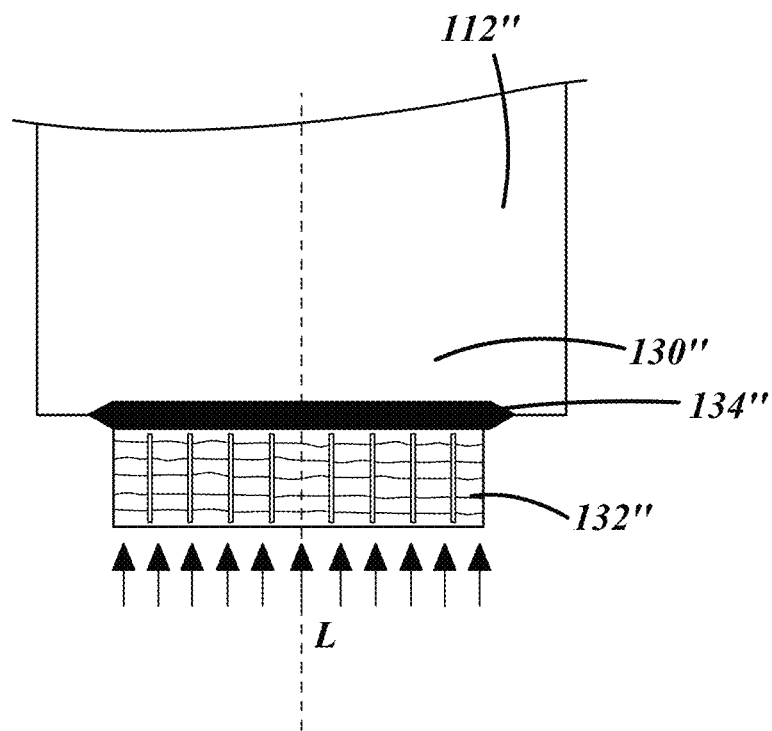
Figure 14B:
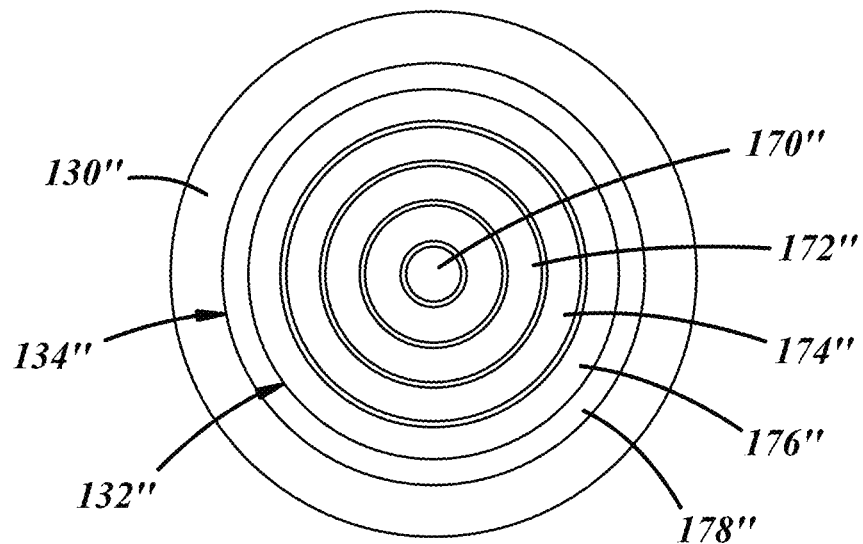
Figure 15:
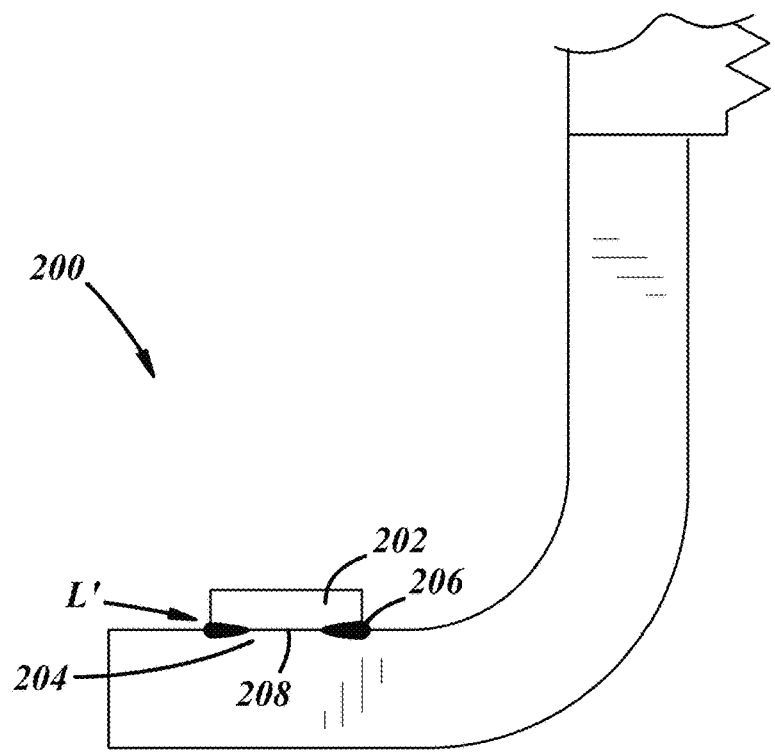
Figure 16:
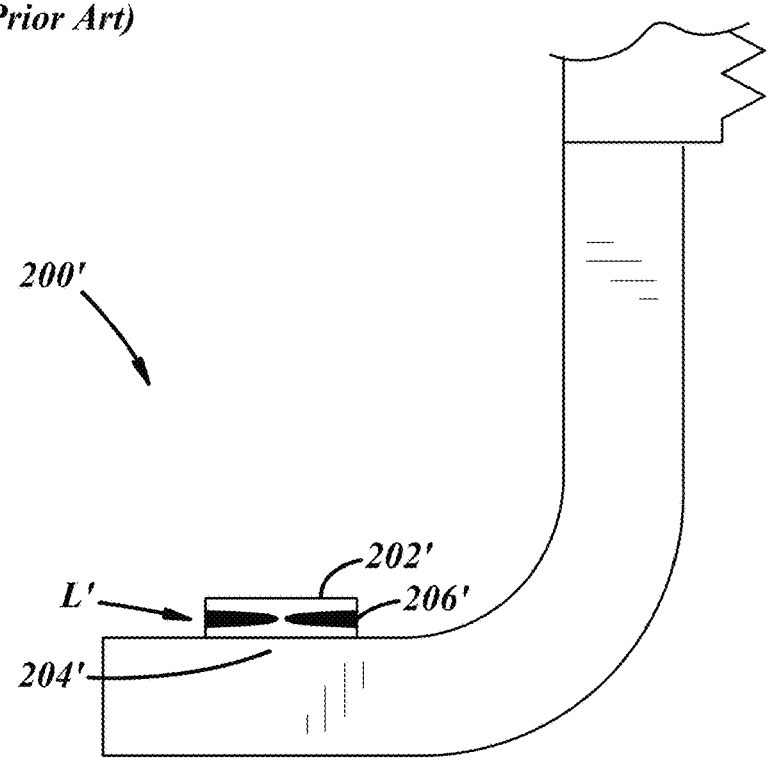

FIGS. 14A and 14B are schematic side and end views, respectively, of a firing end of a center electrode, such as the one shown in FIG. 3, where an additive manufacturing process is being used to build an electrode tip onto an electrode base with concentric rings; and FIGS. 15 and 16 are side views of firing ends of known ground electrodes, where a welding process is being used to weld an electrode tip onto an electrode base.

DESCRIPTION

The spark plug electrode disclosed herein includes an electrode tip that is formed on an electrode base using an additive manufacturing process, such as a powder bed fusion technique. Some non-limiting examples of potential powder bed fusion techniques include: selective laser melting (SLM), selective laser sintering (SLS), direct metal laser sintering (DMLS), and electron beam melting (EBM).

By way of example, the electrode base may be made of a nickel-based material, while the electrode tip may be made of a precious metal-based material, such as those having iridium, platinum, palladium, ruthenium, etc. The precious metal-based material is selected to improve the resistance of the spark plug electrode to corrosion and/or electrical erosion. By using an additive manufacturing process to build the electrode tip on the electrode base, a spark plug electrode with an intermediate layer between the electrode base and tip can be formed. Those skilled in the art will appreciate that when a precious metal-based electrode tip is joined to a nickel-based electrode base, such as by laser welding, there is typically a substantial amount of thermal and/or other stresses on the joint during operation due to the different properties of the materials (e.g., different coefficients of thermal expansion, different melting temperatures, etc.). These stresses, in turn, can undesirably lead to cracking or other damage to the electrode base, the electrode tip, the joint connecting the two components, or a combination thereof. Furthermore, these challenges are exacerbated in an internal combustion engine, where a spark plug electrode is subjected to harsh conditions and extreme temperature and/or load changes. The spark plug electrode described herein, with its intermediate layer that attaches the electrode tip to the electrode base and is formed by additive manufacturing, is designed to address these challenges.

The present spark plug electrode is designed for use in a wide variety of spark plugs and other ignition devices including automotive spark plugs, industrial plugs, aviation igniters, glow plugs, or any other device that is used to ignite an air/fuel mixture in an engine. This includes, but is certainly not limited to, the exemplary automotive spark plugs that are shown in the drawings and are described below. Furthermore, it should be noted that the present spark plug electrode may be used as a center and/or ground electrode. Other embodiments and applications of the spark plug electrode are also possible. Unless otherwise specified, all percentages provided herein are in terms of weight percentage (wt %) and all references to axial, radial and circumferential directions are based on the center or longitudinal axis A of the spark plug.

Referring to FIGS. 1 and 2, there is shown an exemplary spark plug 10 that includes a center electrode 12, an insulator 14, a metallic shell 16, and a ground electrode 18. The center electrode 12 is disposed within an axial bore of the insulator 14 and includes a firing end 20 that protrudes beyond a free end 22 of the insulator 14. As explained below in more detail, the firing end 20 may include an electrode base 30 made from a nickel-based material and an electrode tip 32 made from a precious metal-based material, where the electrode tip is formed on the electrode base with an additive manufacturing process so that an intermediate layer 34 is created therebetween. Insulator 14 is disposed within an axial bore of the metallic shell 16 and is constructed from a material, such as a ceramic material, that is sufficient to electrically insulate the center electrode 12 from the metallic shell 16. The free end 22 of the insulator 14 may protrude beyond a free end 24 of the metallic shell 16, as shown, or it may be retracted within the metallic shell 16. The ground electrode 18 may be constructed according to the conventional J-gap configuration shown in the drawings or according to some other arrangement, and is attached to the free end 24 of the metallic shell 16. According to this particular embodiment, the ground electrode 18 includes a side surface 26 that opposes the firing end 20 of the center electrode and has an electrode tip 40 that may or may not be formed according to an additive manufacturing process. The electrode tip 40 is in the form of a flat pad and defines a spark gap G with the electrode tip 32 of the center electrode such that they provide sparking surfaces for the emission, reception, and exchange of electrons across the spark gap G. The electrode tips 32 and 40 may be formed from the same precious-metal based material or they may be formed from different precious metal-based materials.

In the example shown in FIGS. 1 and 2, the electrode base 30 is a diametrically reduced extension of and is made from the same nickel-based material as the main electrode body 36. The electrode base 30 has been machined, drawn down, or otherwise manufactured so that it has a smaller diameter than that of the adjacent electrode body 36 and, thus, provides a pedestal or surface upon which the electrode tip 32 can be built. In another embodiment, the electrode base 30 is made from the same nickel-based material as the main electrode body 36, but it is not diametrically reduced such that it simply acts as the axial or distal end of the main electrode body and is generally the same shape and size as the main electrode body. It is also possible, however, for the electrode base 30 to be a separate component that is welded, formed by additive manufacturing, or otherwise attached to the axial or distal end of the main electrode body 36; in such an example, the electrode base 30 and main electrode body 36 can be made from the same or different materials.

As will be explained more thoroughly, an additive manufacturing process may be used to form the electrode tip 32 on the electrode base 30 by selectively directing a laser or electron beam at a bed of precious metal-based powder that is brought into contact with the electrode base. This causes the precious metal-based powder, as well as portions of the nickel-based material of the electrode base 30, to melt together and then solidify into an electrode tip layer. The additive manufacturing process is then repeated so that the electrode tip 32 is built up, one layer at a time, on the electrode base 30. The first one or more layer(s) that include both precious metal-based material and nickel-based material can make up the intermediate layer 34 and can have a significant impact on the bonding strength of the electrode tip 32 to the electrode base 30. Once a sufficient number of electrode tip layers have been formed, the electrode tip 32 will reach its desired axial height.

As mentioned above, the present spark plug electrode is not limited to the exemplary configuration shown in FIGS. 1 and 2, as it may be employed in any number of different applications, including automotive spark plugs, industrial plugs, aviation igniters, glow plugs, or other devices. Some non-limiting examples of other potential applications where the present spark plug electrode could be used are illustrated in FIGS. 3 and 4, where similar reference numerals as FIGS. 1 and 2 denote similar features. Other embodiments and examples are certainly possible.

In FIG. 3, the electrode base 30' is simply the lower or axial end of the main electrode body 36 and is not a machined, drawn down or otherwise diametrically reduced extension of the adjacent electrode body. In this example, the electrode tip 32' is simply built or formed onto the axial end of the main electrode body 36, which is the electrode base 30', and may be manufactured using a bed of precious metal-based powder and the additive manufacturing process described herein. The drawings show the electrode tip 32' as having roughly the same diameter as the corresponding electrode base 30', but this is not necessary, as the electrode tip 32' could be diametrically reduced, with respect to the main electrode body and/or the electrode base. The connection or attachment area between the electrode base 30' and the electrode tip 32' is the intermediate layer 34'. An electrode tip 40', which is optional and is preferably made of a precious metal-based material, can be formed by additive manufacturing or it can be welded onto the side surface 26 of the ground electrode 18 to define a spark gap G with the electrode tip 32'. If the electrode tip 40' is made from an additive manufacturing process, an intermediate layer 44' may be located between the electrode tip 40' and the electrode base of the ground electrode 18 (in this case, the electrode base is the side surface 26 of the ground electrode 18). The electrode tips 32' and 40' may be formed from the same precious-metal based material or they may be formed from different precious metal-based materials, and the intermediate layers 34' and 44' may be formed from the same material or from different materials. It should be appreciated that the discussion of electrode bases, electrode tips and/or intermediate layers may equally apply to the components of the center electrode (e.g., components 30, 30', 30", 32, 32', 32", 34, 34', 34") and/or components of the ground electrode (e.g., components 26, 40, 40', 40", 44', 44") and are not limited to just one electrode.

Turning to FIG. 4, the electrode base 30" extends from the main electrode body 36 and may be an integral extension of the electrode body or it may be a separate component that has been welded, additive manufactured or otherwise attached to the end of the electrode body, as already explained. As with some of the previous embodiments, electrode tip 32" is formed or built on electrode base 30", one layer at a time, with intermediate layer 34" located therebetween. The electrode tip 32" may have an outer diameter that is equal to, less than or greater than that of the corresponding main electrode body 36. Turning now to the ground electrode, a hole or bore 46" extends through the thickness of the ground electrode 18 so that a pre-manufactured ground electrode tip assembly 48" can be attached therein. According to the example illustrated in FIG. 4, the ground electrode tip assembly 48" includes an electrode base 42" made from a nickel-based material, an intermediate layer 44" made from a material whose coefficient of thermal expansion (CTE) is in between that of the electrode base and the electrode tip (e.g., a platinum-nickel alloy), and an electrode tip 40" made from a precious metal (e.g., an iridium- or platinum-based material). The compositions of components or layers 42", 44" and/or 40" may be the same as or different from those of the corresponding components in the previous embodiments. In order to overcome attachment challenges presented by different CTEs, the electrode tip 40" and the intermediate layer 44" can be built on the electrode base 42" via additive manufacturing techniques; this results in an interfused boundary between layers, as opposed to a hard or discrete boundary produced by welding, which reduces stress at the inter-layer boundaries. In addition, the difference between the CTE of the electrode tip 40" and the CTE of the intermediate layer 44" is less than the difference in CTEs between the electrode tip 40" and the electrode base 42" or the ground electrode 18. The electrode base 42", which can be made from a nickel-based material like Inconel 600 or 601, is then welded at 38 to the ground electrode 18, which is also made from a nickel-based material; this too, reduces stress at the component interface since both the electrode base 42" and the ground electrode 18 are made from the same or similar nickel-based materials. In this way, the spark plug is able to avoid a welded joint between two substantially dissimilar materials (two "substantially dissimilar materials," as used herein, means two materials where one CTE is more than 25% greater than the other CTE). The interface between layers 40"/44" and 44"/42" (interfused boundaries) are produced by additive manufacturing and are, therefore, not "welded joints"; and the welded joint 38 between components 42"/18 (hard boundary) is between similar materials, not substantially dissimilar materials. Thus, electrode tip assembly 48" does not include a welded joint between substantially dissimilar materials.

Electrode base 30, 30', 30", 42" is the section or portion of the electrode on which the electrode tip is formed by additive manufacturing and, thus, acts as a carrier material for the electrode tip. As mentioned above, the electrode base 30, 30', 30", 42" may be an integral part or extension of a main electrode body or it may be a separate piece or component that is welded, additive manufactured, or otherwise attached to the main electrode body. If the electrode base is an integral extension of or has been welded to the main electrode body, then it is likely that the electrode base was manufactured by drawing, extruding, machining, and/or some other conventional process. If, on the other hand, the electrode base was additive manufactured on the main electrode body 36, then the electrode base would have been created from a laser melted or sintered powder bed, in much the same way that the electrode tip is formed on the electrode base. In either case, it is usually preferable for the electrode base 30, 30', 30", 42" to be made from a nickel-based material. The term "nickel-based material," as used herein, means a material in which nickel is the single largest constituent of the material by weight, and it may or may not contain other constituents (e.g., a nickel-based material can be pure nickel, nickel with some impurities, or a nickel-based alloy). According to one example, the electrode base 30, 30', 30", 42" is made from a nickel-based material having a relatively high weight percentage of nickel, such as a nickel-based material comprising 98 wt % or more nickel. In a different example, the electrode base is made from a nickel-based material having a lower weight percentage of nickel, like a nickel-based material comprising 50-90 wt % nickel (e.g., INCONEL™ 600 or 601). One particularly suitable nickel-based material has about 75-80 wt % nickel, 10-20 wt % chromium, and 5-10 wt % iron. For nickel-based materials, the electrode base 30, 30', 30", 42" may have a coefficient of thermal expansion between $12\times10^{-6}$ m/mK and $15\times10^{-6}$ m/mK (e.g., $13.4\times10^{-6}$ m/mK at 20° C.-200° C.), and a melting temperature between 1,200° C. and 1,600° C. (e.g., 1,400° C.). The diameter or size of the electrode base 30, 30', 30", 42" can vary substantially depending on the particular application and embodiment (e.g., the diameter of electrode base 30, which is part of the center electrode, is likely smaller than that of electrode base 42", which is part of the ground electrode tip assembly).

According to the non-limiting example shown in FIG. 2, where the electrode base 30 is a narrowed down extension of center electrode 12, the electrode base may have a diameter between 0.4 mm and 1.0 mm, inclusive, and even more preferably between 0.5 mm and 0.9 mm, inclusive (the same dimensions could apply to base electrode 30" in FIG. 4). In the example of FIG. 3, where the electrode base 30' constitutes the lower axial end of the center electrode 12, the electrode base may have a diameter between 1.4 mm and 3.2 mm, inclusive, and even more preferably between 2.0 mm and 3.0 mm, inclusive. In terms of the FIG. 4 example, where the electrode base 42" is part of the ground electrode tip assembly 48", the electrode base may have a diameter between 0.5 mm and 2.0 mm, inclusive, and even more preferably between 0.7 mm and 1.5 mm, inclusive. Other materials, including those that are not nickel-based, and other sizes and shapes may be used for the electrode base 30, 30', 30", 42" instead. It should be noted that, in some instances, the side surface 26 and/or the ground electrode 18 itself may constitute the electrode base (e.g., in the embodiments of FIGS. 2 and 3).

The term "electrode base," as it is used herein, means the section or portion of the electrode on which the electrode tip is formed by additive manufacturing. The electrode base may include embodiments that: are diametrically reduced with respect to a main electrode body, as well as those that are not; are an integral part or extension of a main electrode body, as well as those that are a separate component; are located at an axial end of a main electrode body, as well as those that are located on a side surface or other part of the electrode; are part of a center electrode or a ground electrode; have a thermal or heat conducting core (e.g., a copper-based core), as well as ones that do not; or are made from the same material as a main electrode body, as well as those that are made from another material, to cite but a few possibilities. Non-limiting examples of possible electrode bases include electrode base 30, 30', 30", 42", 26 and 18.

Figure 5:
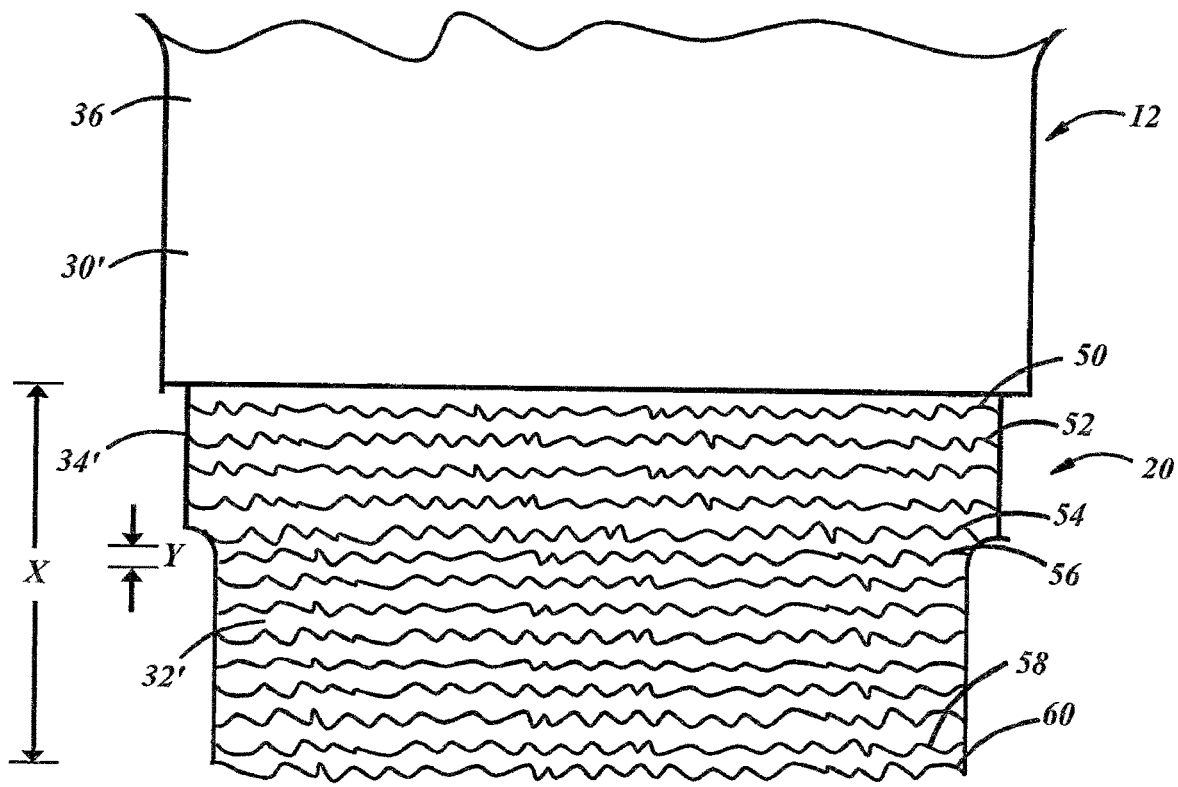
FIG. 5 is an enlarged schematic view of a firing end of a center electrode, such as the one shown in FIG. 3, where the center electrode has an electrode tip that is built onto an electrode base via an additive manufacturing process and includes a number of laser deposition layers.
Figure 6:
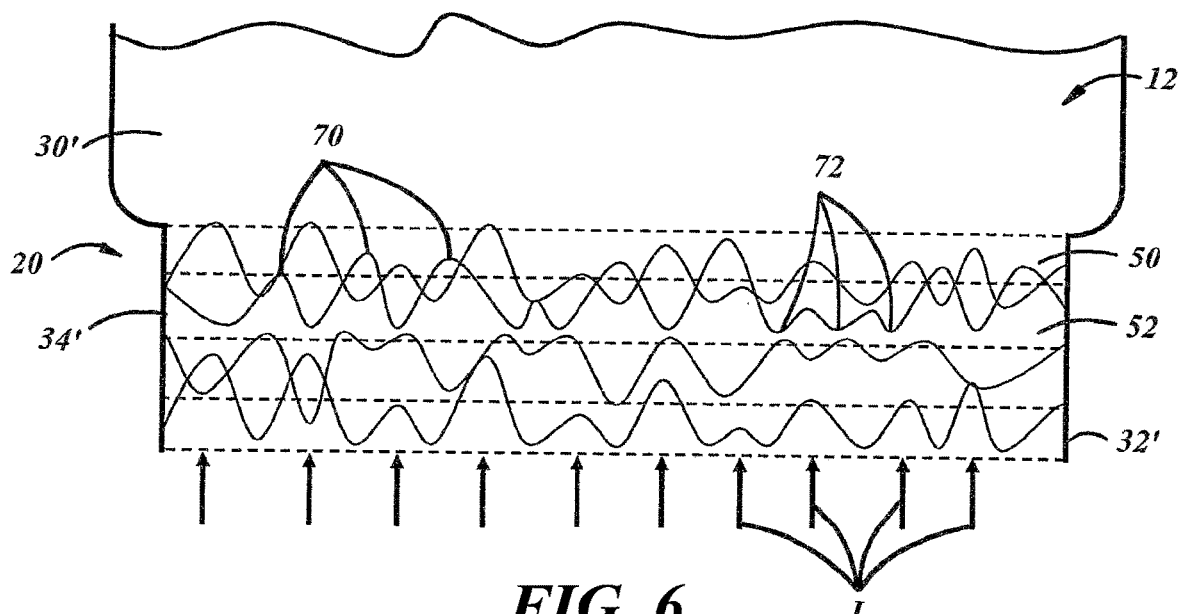
FIG. 6 is an enlarged schematic view of the center electrode in FIG. 5, where a laser deposition layer is shown from the side being formed via an additive manufacturing process.

Electrode tip 32, 32', 32", 40', 40" is the section or portion of the electrode, usually the sparking portion, that is formed on the electrode base by additive manufacturing. As such, the electrode tip 32, 32', 32", 40', 40" may be made from a bed of precious-metal based powder that is brought into close proximately with the electrode base so that, when irradiated by a laser or electron beam, the precious metal-based powder and some of the solid material of the electrode base are melted and then solidify into an initial laser deposition layer 50. This causes the electrode tip to be coated onto the electrode base. This process of creating individual layers is repeated, thereby creating a number of laser deposition layers 50-60 that are sequentially built or stacked on one another, as illustrated in FIGS. 5 and 6. Each laser deposition layer has an average layer thickness Y, which may be between 20 and 100 μm, and the total or sum of all of the layer thicknesses is the electrode tip height X, which may be between 0.1 and 1.0 mm, or even more preferably between 0.1 and 0.6 mm. The electrode tip 32, 32', 32", 40', 40" may be made from a precious metal-based material so as to provide improved resistance to corrosion and/or erosion. The term "precious metal-based material," as used herein, means a material in which a precious metal is the single largest constituent of the material by weight, and it may or may not contain other constituents (e.g., a precious metal-based material can be pure precious metal, precious metal with some impurities, or a precious metal-based alloy). Precious metal-based materials that may be used include iridium-, platinum-, ruthenium- and/or palladium-based materials, to cite a few possibilities. According to one example, the electrode tip 32, 32', 32", 40', 40" is made from an iridium- or platinum-based material, where the material has been processed into a powder form. In a non-limiting example, the precious metal-based powder has a particle size distribution of approximately 5 to 30 μm, inclusive. For iridium-based materials, the electrode tip may have a coefficient of thermal expansion between $6 \times 10^{-6}$ m/mK and $7 \times 10^{-6}$ m/mK and a melting temperature between 2,400° C. and 2,500° C.; for platinum-based materials, the electrode tip may have a coefficient of thermal expansion of between $8 \times 10^{-6}$ m/mK and $10 \times 10^{-6}$ m/mK and a melting temperature between 1,700° C. and 1,800° C.

The diameter or size of the electrode tip 32, 32', 32", 40" varies depending on the particular application and embodiment. For instance, in the non-limiting examples shown in FIGS. 2 and 4, where the electrode tip 32, 32" extends from the electrode base 30, 30" and is generally the same size, the electrode tip may have a diameter between 0.4 mm and 1.0 mm, inclusive, and even more preferably between 0.5 mm and 0.9 mm, inclusive. In the example of FIG. 3, the electrode tip 32' is approximately the same size as the corresponding electrode base 30' and may have a diameter between 1.4 mm and 3.2 mm, inclusive, and even more preferably between 2.0 mm and 3.0 mm, inclusive, and the electrode tip 40' is somewhat smaller in diameter than tip 32'. In terms of the FIG. 4 example, where the electrode tip 40" is part of the ground electrode tip assembly 48", the electrode tip 40" is roughly the same size as the electrode base 42" and, thus, can have a diameter between 0.5 mm and 2.0 mm, inclusive, and even more preferably between 0.7 mm and 1.5 mm, inclusive. Other materials, including those that are not precious metal-based, and other sizes and shapes may be used for the electrode tip 32, 32', 32", 40" instead.

The term "electrode tip," as it is used herein, means the section or portion of the electrode, usually the sparking portion, that is formed on the electrode base by additive manufacturing. The electrode tip may include embodiments that: are diametrically reduced with respect to an electrode base, as well as those that are not; are in the shape of rivets, cylinders, bars, columns, wires, balls, mounds, cones, flat pads, disks, rings, sleeves, etc.; are located at an axial end of an electrode base, as well as those that are located on a side surface or other part of the electrode base; are part of a center electrode or a ground electrode; are made from a precious metal-based material (e.g., materials that have iridium, platinum, palladium, ruthenium, etc.), as well as those that are made from another material; and have additional stress relieving or intermediate layer(s) between the electrode base and tip, as well as ones that do not, to cite but a few possibilities. Non-limiting examples of possible electrode tips include electrode tip 32, 40, 32' 40', 32" and 40".

Intermediate layer 34, 34', 34", 44" is physically located between the electrode base and the electrode tip and is a transitional section or portion of the electrode that has a CTE between that of the electrode base and the electrode tip. The intermediate layer 34, 34', 34", 44" is designed to reduce, mitigate, offset and/or address the thermal stresses that arise between those two components when the spark plug is in operation, thereby improving the attachment of the electrode tip to the electrode base. As stated above, the thermal properties or characteristics of the electrode base and the electrode tip, such as their coefficients of thermal expansion, differ from one another; sometimes, to a substantial degree. When the spark plug is in operation, the temperatures seen at the firing end can reach extremely high levels, which conventionally results in the different metals expanding and contracting at different rates and exerts a significant amount of stress on the weld that attaches the tip to the base. The intermediate layer 34, 34', 34", 44" with its one or more stacked layers, is manufactured in such a way that thermally induced stresses are minimized or at least reduced, thereby improving the durability of the spark plug and increasing its service life. The present electrode may achieve these goals, at least partially, through the use of several features: an intermediate layer with a CTE that is between that of a corresponding electrode base and tip, and a whole area connection between the electrode base and tip that is created through additive manufacturing (e.g., selective laser melting (SLM), selective laser sintering (SLS), direct metal laser sintering (DMLS), electron beam melting (EBM) and/or any other suitable 3D printing process), as opposed to simply welding the electrode tip to the base. According to one example, the intermediate layer includes a platinum-nickel alloy, such as Pt-10Ni or Pt-30Ni, and has a coefficient of thermal expansion between $10 \times 10^{-6}$ m/mK and $12 \times 10^{-6}$ m/mK (e.g., $10.9 \times 10^{-6}$ m/mK or $11.5 \times 10^{-6}$ m/mK). If an iridium-based electrode tip with a CTE of around $6.5 \times 10^{-6}$ m/mK is directly attached (i.e., without an intermediate layer) to a nickel-based electrode base with a CTE of about $13.4 \times 10^{-6}$ m/mK, then there is a large CTE delta or difference between the adjacent layers of about $6.9 \times 10^{-6}$ m/mK; this is substantial and can introduce significant thermal stresses on the joint. By introducing an intermediate layer with the above-mentioned Pt-30Ni alloy in between the electrode tip and base, the inter-layer CTE difference is reduced. To demonstrate, the inter-layer CTE difference between the electrode base and the intermediate layer is only about $1.9 \times 10^{-6}$ m/mK (13.4−11.5=1.9), and the inter-layer CTE difference between the intermediate layer and the electrode tip is about $5.0 \times 10^{-6}$ m/mK (11.5−6.5=5.0); thus, the largest inter-layer CTE difference, which could be a possible failure point, is only $5.0 \times 10^{-6}$ m/mK, versus $6.9 \times 10^{-6}$ m/mK without the intermediate layer. In a sense, the intermediate layer with its intermediate CTE value helps break up the large inter-layer CTE difference that exits between the electrode base and tip.

The intermediate layer 34, 34', 34'', 44', 44'' may include multiple layers, also referred to as laser deposition layers, which together make up the intermediate layer and are designed to further reduce the inter-layer CTE difference between adjacent layers. The composition of the intermediate layer 34, 34', 34'', 44', 44'' may be uniform across the intermediate layer or, in other examples, the composition of the intermediate layer varies across the intermediate layer (e.g., the composition varies across the different laser deposition layers so that the overall intermediate layer composition is non-uniform). Keeping with the example in the previous paragraph, if an additional laser deposition layer having a Pt-10Ni composition was added to the intermediate layer 34, 34', 34'', 44', 44'', then the various inter-layer CTE differences would be as follows: CTE difference for electrode base to Pt-30Ni junction (13.4−11.5=$1.9 \times 10^{-6}$ m/mK), CTE difference for Pt-30Ni to Pt-10Ni junction (11.5−10.9=$0.6 \times 10^{-6}$ m/mK), and CTE difference for Pt-10Ni to electrode tip (10.9−6.5=$4.4 \times 10^{-6}$ m/mK). In this example, the largest inter-layer CTE difference is only $4.4 \times 10^{-6}$ m/mK, versus $6.9 \times 10^{-6}$ m/mK without the intermediate layer. Additional laser deposition layers could be added to the intermediate layer to help further break up the large inter-layer CTE difference between the electrode base and tip. The diameter or size of the intermediate layer 34, 34', 34'', 44', 44'' varies depending on the particular application and embodiment, and it may have the same diameter as the electrode base and/or electrode tip.

These features are further explained in conjunction with FIGS. 5-8, which use a non-limiting example similar to the center electrode in FIG. 3 as a basis of discussion. It should be appreciated that the following description applies to the other electrode embodiments as well (i.e., FIGS. 1, 2, 4 and ground electrodes) and is not limited to the example of FIG. 3.

Figure 7:
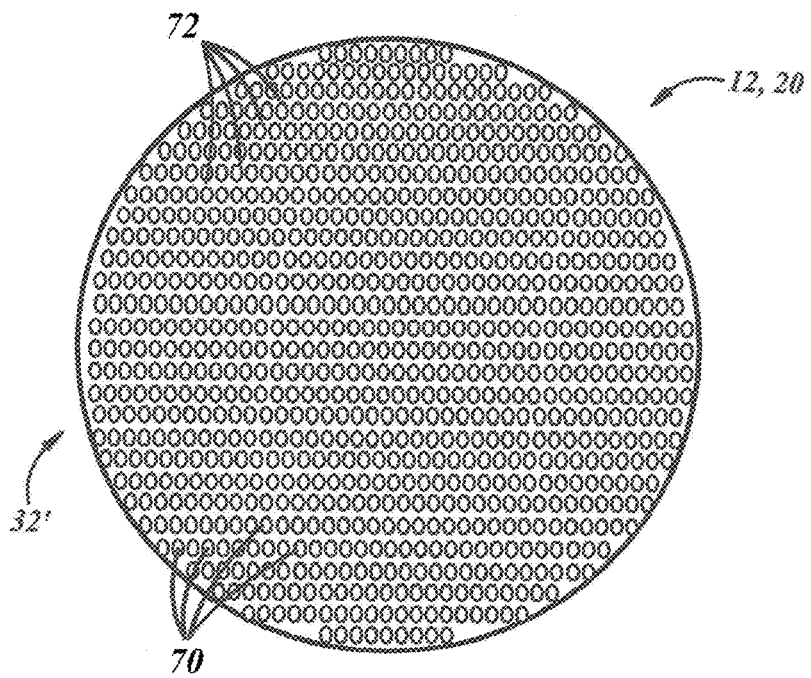
FIG. 7 is an enlarged schematic view of the center electrode in FIG. 5, where a laser deposition layer is shown from the end being formed via an additive manufacturing process.
Figure 8:
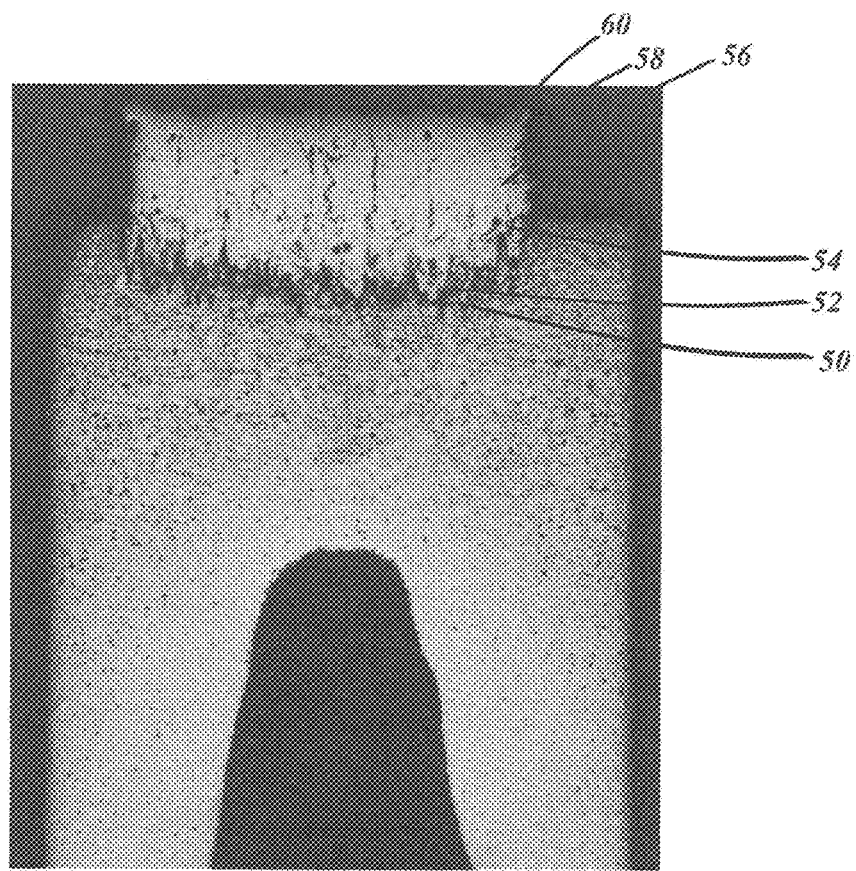
FIG. 8 is an enlarged micrograph of a firing end of a center electrode, such as the one shown in FIG. 3, where the center electrode has an electrode tip that is built onto an electrode base via an additive manufacturing process and includes a number of laser deposition layers.
Figure 9:
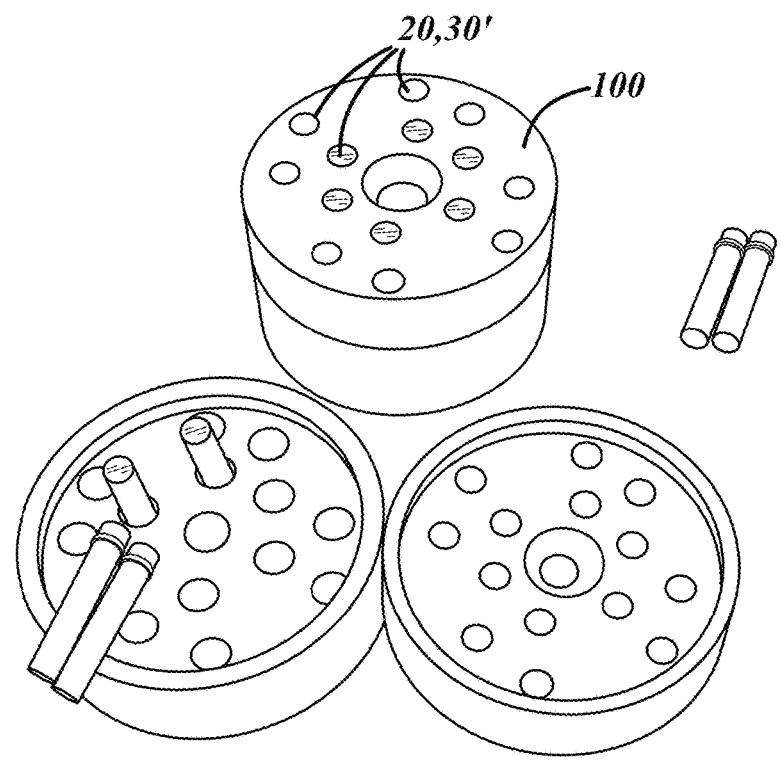
FIGS. 9 and 10 are perspective and cross-sectional views, respectively, of pieces of equipment and several center electrodes, where the equipment may be used to build electrode tips onto electrode bases via an additive manufacturing process.

Turning to FIGS. 5-7, there are shown enlarged illustrations of the firing end 20 of the center electrode 12, where the electrode tip 32' is formed on the electrode base 30' with the intermediate layer 34' located therebetween, which has a CTE between that of the electrode base and tip. It should be appreciated that these drawings are only schematic illustrations, as the different laser deposition layers 50-60 will not likely be perfectly discrete flat layers, as illustrated with dashed lines. A micrograph is provided in FIG. 8 that more accurately captures an actual cross-sectional structure of the electrode, where the different laser deposition layers are more jagged or serrated than flat, and are more blended into one another as opposed to being separate or discrete. In order to form the initial laser deposition layer 50, the main electrode body 36 can be inserted into a jig or other tool 100 that maintains it in a vertical orientation, with the firing end 20 facing upwards (see FIGS. 9 and 10). A bed of powder 102 that includes precious-metal based material can then be placed over the electrode base 30' such that a thin layer of precious-metal based powder covers the axial or distal end of the electrode base. Once the powder bed is in place, a laser L can be used to melt or at least sinter the thin powder layer that is over top of the electrode base 30', along with a certain amount of the electrode base itself; this is the powder bed fusion process. When the combination of the melted powder (precious metal-based material) and the electrode base 30' (nickel-based material) solidifies, it forms the initial laser deposition layer 50 (the creation of such layers may be done in a protective gas atmosphere). This process is then repeated a number of times to then form the subsequent laser deposition layers 52-60. The first several layers that are formed (e.g., laser deposition layers 50, 52, etc.) may include material from both the electrode base 30' and the electrode tip 32' and are designed to have a CTE value that is in between that of the electrode base 30' and electrode tip 32'; layers 50, 52 may constitute the intermediate layer 34'. The final laser deposition layer 60 that is formed may act as a sparking surface. In some examples, the intermediate layer 34' is comprised of 50% or more precious metal (i.e., of the total material, both nickel—and precious metal-based material, that makes up the intermediate layer 34', at least 50% is precious metal). At one point, the laser deposition layers may only include material from the powder bed (i.e., the precious metal-based material); these layers constitute the electrode tip 32' and can be comprised of 95% or more precious metal. A non-limiting example of a possible electrode structure includes: an electrode base made of a nickel-based material (e.g., Inconel 600), an intermediate layer made of one or more platinum-based material(s) (e.g., Pt-10Ni or Pt-30Ni), and an electrode tip made of one or more precious metal-based material(s) (e.g., platinum- or iridium-based materials).

Since each laser deposition layer 50-60 is formed first by melting or sintering powder from a powder bed 102 and then allowing the material to solidify, it is possible to adjust or modify the composition of the different laser deposition layers by changing the composition of the powder bed 102. This enables the present electrode to have a tailored or customized composition gradient across the intermediate layer 34' and/or the electrode tip 32'. For example, in order to minimize the inter-layer CTE difference between the electrode base 30' and the intermediate layer 34', the initial laser deposition layer 50 may be made from a powder bed that includes 50% nickel-based material and 50% precious metal-based material, whereas the next laser deposition layer 52 may be made from powder that has the same composition or one with more precious metal-based material. As each laser deposition layer is formed, and is thus further away from the electrode base 30', the relative percentage of nickel-based material may decrease while the relative amount of precious metal-based material may increase. At the final laser deposition layer 60, a powder bed that includes only precious metal-based material may be used, as that material is preferable for a sparking surface. This creates a tailored composition gradient across the intermediate layer 34' and/or the electrode tip 32' that spreads out the differences in thermal coefficients of expansion across a number of inter-layer boundaries, as opposed to having the full difference of those coefficients experienced at a single inter-layer boundary, as already explained. In the past, in order to achieve a tailored composition gradient like this, one would typically have to weld small slices or layers of the electrode tip on top of one another, which is very tedious and costly and can have the undesirable effect of creating numerous weld joints that can fail. With the present electrode, a tailored composition gradient can be achieved through additive manufacturing by selectively building layers on top of each other such that they all blend into an integrated electrode assembly with a composition that continuously increases, in terms of the relative amount of precious metal-based material, as one moves from the electrode base 30' to the end of the electrode tip 32'. If changing the composition of the powder bed 102 between layers proves to be too burdensome or time consuming, it is possible to use the same powder composition for a certain number of layers (e.g., a 50% nickel-based material, 50% precious metal-based material blend for the first 5 layers), then change the powder composition for a certain number of layers (e.g., a 25% nickel-based material, 75% precious metal-based material blend for the next 5 layers), and then complete the electrode tip 32' with a final powder composition for a certain number of remaining layers (e.g., a 100% precious metal-based material blend for the final 5 layers). Of course, this is only an example, as many other embodiments are certainly possible. It is also preferable that the intermediate layer 34' have a fine grain structure in the predominant volume of the structure.

Figure 10:
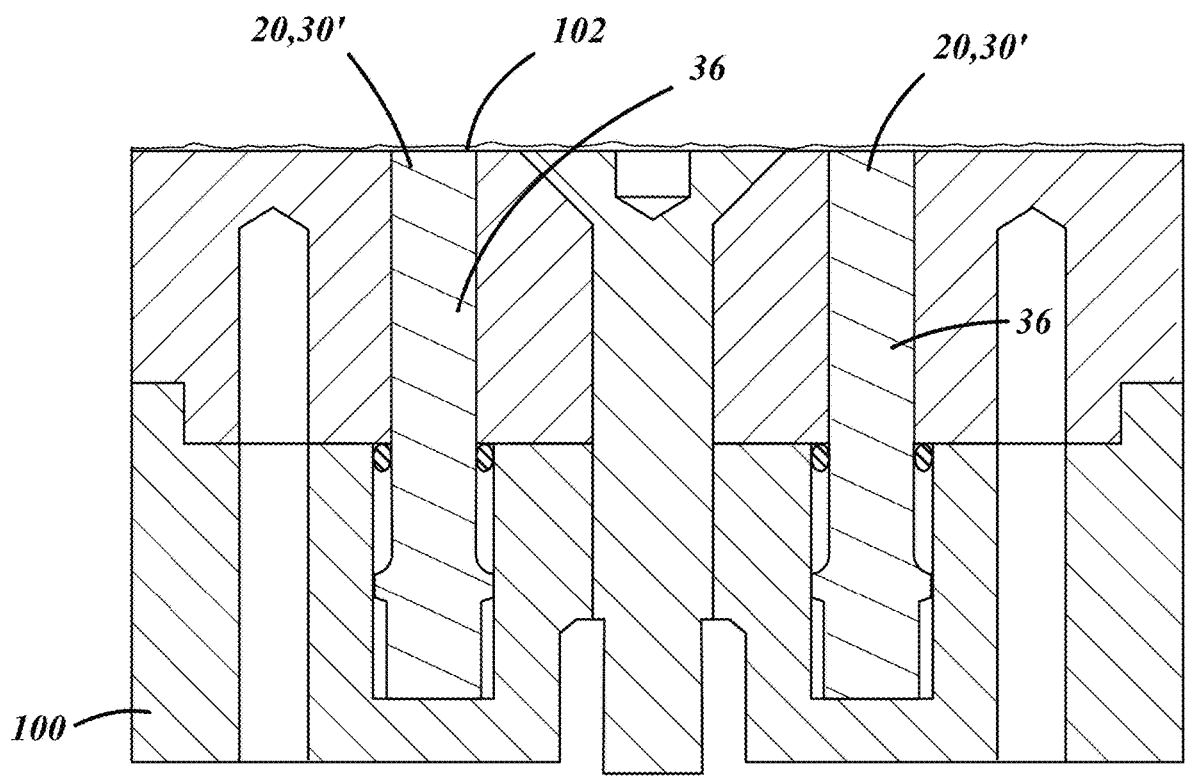

In FIG. 6, there are shown the first four or so laser deposition layers of the intermediate layer 34' being formed, where each layer has a series of valleys 70 and peaks 72. For purposes of consistency, the center electrode 12 in FIGS. 5 and 6 has been drawn in the same orientation as shown in FIGS. 1-4. However, during manufacture, the center electrode 12 would likely be inverted so that the firing end 20 and electrode base 30' would be facing upwards so that a thin bed of powder could be placed on top of the axial or distal end surface of the center electrode, thereby covering it up, as depicted in FIG. 10. The series of valleys 70 represent those areas where a laser L has impinged or struck the end of the electrode, through the thin powder bed, and created a pit or indentation of some type. The series of peaks 72, on the other hand, represent those sections of electrode that were not directly struck by the laser so that a protrusion or peak has been left in place. The valleys 70 and/or peaks 72 may be conical in shape. Since the surface of each layer is not flat or planar, as the case with traditional electrodes where a disc- or plate-shaped tip is discretely welded onto the electrode, the inter-layer surface area of each laser deposition layer 50-60 is larger. Put differently, the surface area of a layer that has numerous peaks and valleys is larger than the corresponding surface area of the same layer if it was perfectly flat. According to one example, the average inter-layer surface area of the intermediate layer 34' (i.e., the average surface area of each laser deposition layer 50-52 in the intermediate layer) is greater than or equal to 1.8× the surface area of the electrode base 30', before the tip was formed, if the electrode base was perfectly flat.

FIGS. 11-14(B) illustrate what is referred to as a "whole area connection" between the electrode base and electrode tip that can be created through an additive manufacturing process, such as any of the additive manufacturing or 3D printing processes mentioned herein or otherwise known by those skilled in the art. As discussed above, one of the primary challenges for spark plug electrodes that have a precious metal-based electrode tip is the attachment or joint that connects the electrode tip to an electrode base. In addition to challenges presented by significant inter-layer CTE differences, another challenge for traditional spark plugs involves the difficulty of precisely and securely welding the electrode tip to the electrode base. Due to their small size and their extremely high melting temperatures, precious metal-based electrode tips can be difficult to weld to nickel-based electrode bases. The embodiments described in the following paragraphs help address and overcome some of these and other types of challenges. It should be appreciated that any of the previously described embodiments, features, materials, techniques, etc. may equally apply to the embodiments of the following paragraphs.

Figure 11:
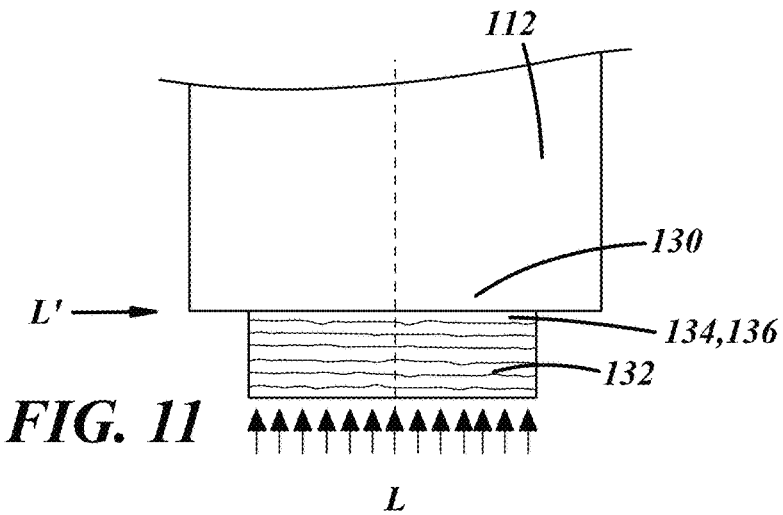
FIGS. 11 and 12 are schematic views of firing ends of center electrodes, such as the one shown in FIG. 3, where an additive manufacturing process is being used to build an electrode tip onto an electrode base.

In FIG. 11, a center electrode 112 is shown with an electrode base 130, an intermediate layer 134, and an electrode tip 132 with a number of laser deposition layers, where the intermediate layer helps form a whole area connection 136 between the electrode base and tip. The electrode tip 132 is built or erected on the electrode base 130, layer by layer through additive manufacturing and/or 3D printing, as already described, instead of the electrode tip already being in its final form (e.g., a column, disk, ring, etc.) when it is welded to the electrode base, as is the case with known prior art welding techniques. In the whole area connection 136, at least some solidified material from the electrode base 130 (e.g., a solid nickel-based material that has been melted and resolidified) has intermixed and/or interfused with at least some solidified material from the electrode tip 132 (e.g., a powder precious metal-based material that has been melted and solidified). Because the intermediate layer 134 and the electrode tip 132 are built with an additive manufacturing process where a laser L strikes the workpiece in an axial direction of the center electrode 112, as opposed to welding a preformed electrode tip onto the base with a laser L' (prior art laser welding) that is in a generally radial direction, a whole area connection 136 can be formed. The whole area connection 136 covers most of, if not the entire, area or footprint where the electrode tip 132 connects to the electrode base 130, and it provides an efficient thermal junction between the two components. For instance, the whole area connection 136 can enable heat generated at the sparking surface of the electrode tip 132 to be efficiently transferred across the barrier or interface (interfused boundary) and into the electrode base 130, where it can be better dissipated. The whole area connection 136 can also exhibit a more uniform set of thermal expansion and/or contraction characteristics. This, in turn, can improve the thermal resistance of the intermediate layer 134 so that the electrode tip 132 can stay better attached to the electrode base 130.

Figure 12:
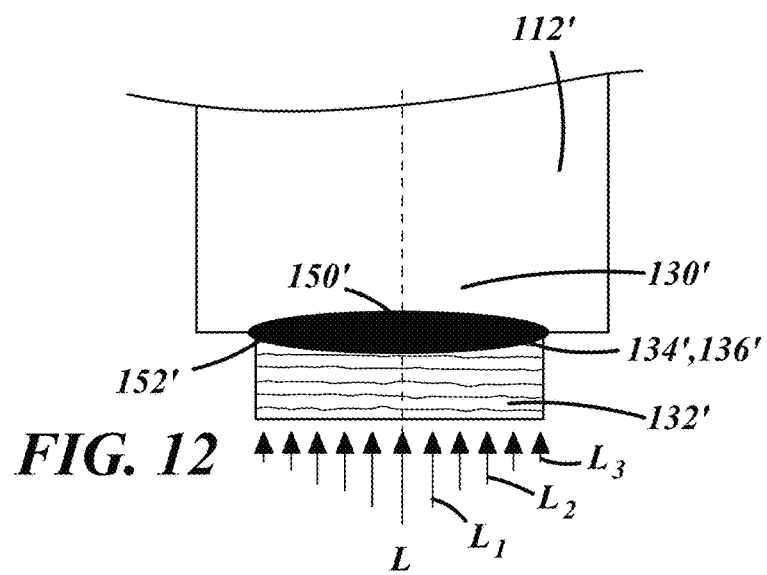

FIG. 12 shows another example of a center electrode 112' having an electrode base 130', an intermediate layer 134', and an electrode tip 132' with a number of laser deposition layers, except in this example the intermediate layer forms a whole area connection 136' that is customized to be thicker in certain sections. Since the laser L that is used with the additive manufacturing process is generally directed in the axial direction, it can be controlled to melt and remelt certain areas of the intermediate layer 134' to create a customized or tailored whole area connection 136'. In the drawing, the length of each laser line is representative of the total amount of energy that the laser imparts to the workpiece at that location. For instance, the laser lines $L_1$ represent those areas where laser L has imparted more energy into the workpiece, either through multiple laser cycles or passes, longer durations per laser cycle, greater energy per laser cycle, and/or some other combination of techniques. Whereas, laser lines $L_2$ and $L_3$ represent areas where laser L has delivered less energy into the workpiece, perhaps through a single laser cycle. This impact can be seen in the relative thickness of the whole area connection 136' at different locations; at a center section 150', the intermediate layer 134' has been melted and remelted several times with laser $L_1$ to create a thicker section of the whole area connection 136'; towards a radially outboard section 152', the intermediate layer 134' may only have been melted once by laser $L_3$, which results in a thinner section of the whole area connection 136'. The thinner and thicker sections of the whole area connection 136' can produce a non-uniform whole area connection 136' (in this case, its cross-sectional shape is somewhat lenticular), which in turn can influence a whole host of thermal and/or other performance related factors. For example, the thicker center section 150' may provide increased thermal conductivity or heat dissipation in this targeted area.

Figure 13:
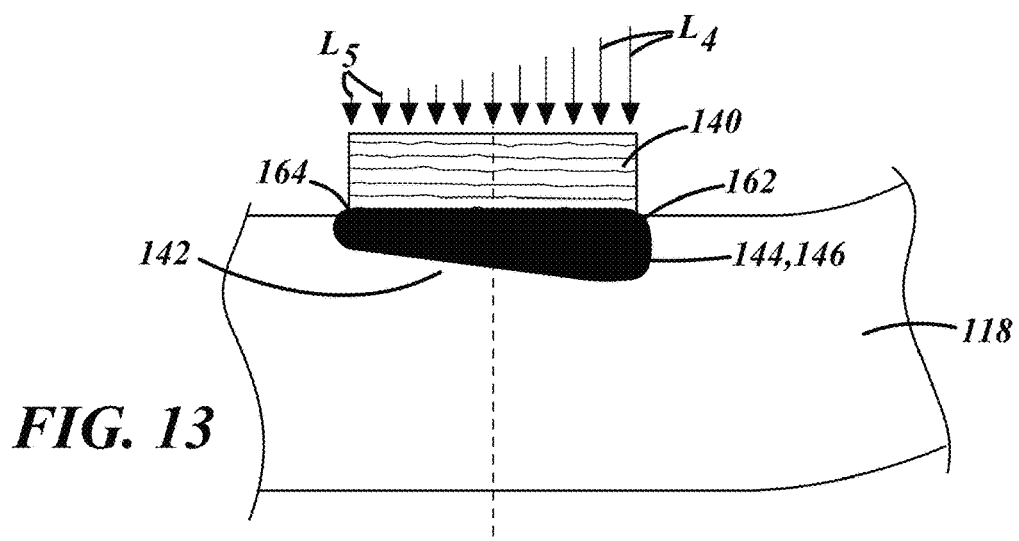
FIG. 13 is a schematic view of a firing end of a ground electrode, such as the one shown in FIG. 3, where an additive manufacturing process is being used to build an electrode tip onto an electrode base.

FIG. 13 illustrates a different example, only this example is directed to a ground electrode 118 that has an electrode base 142, an intermediate layer 144, and an electrode tip 140 with a number of laser deposition layers, where the intermediate layer helps form a whole area connection 146 between the electrode base and tip. Again, the additive manufacturing process has enabled an intermediate layer 144 and/or whole area connection 146 that is customized for a certain application. In this embodiment, a first outboard section 162 has been created by delivering a substantial amount of energy from laser L to this area (represented by laser lines $L_4$) so that the intermediate layer 144 melts and remelts several times, thus, resulting in a thicker whole area connection 146 on the right side of the assembly. A second outboard section 164 is built with laser L, except the amount of energy delivered in this area (represented by laser lines $L_5$) is less than that in the first outboard section 162. Again, a non-uniform whole area connection 146 may be used to intentionally tailor or customize the thermal conductivity and/or other characteristics in certain parts of the electrode.

In FIGS. 14(A)-(B), another example of a center electrode 112" is shown having an electrode base 130", an intermediate layer 134", and an electrode tip 132" with a series of laser deposition layers. In this embodiment, a laser L is used to build the intermediate layer 134" and the electrode tip 132" as a series of concentric segments 170"-178". For instance, after the intermediate layer 134" has been formed, a first laser cycle or pass could be used to build a portion of the first segments 170" at a center location. After this, a second laser cycle could be used to build a second segment 172", then a third segment 174" and so on. This process could be carried out on a layer-by-layer basis or a segment-by-segment basis. According to a layer-by-layer basis, the additive manufacturing process builds a first thin layer of the first segment 170", then a first thin layer of the second segment 172", then a first thin layer of the third segment 174" and so on; once a first thin layer has been created for all of the segments, then a thin second layer is formed for all of the segments, then a thin third layer and so on until the electrode tip 132" is built to the desired axial height. According to a segment-by-segment basis, the process builds a first thin layer of the first segment 170", then a second thin layer of the first segment, then a third thin layer of the first segment, and so on until the first segment 170" reaches the desired axial height, at which time the additive manufacturing process builds the second segment 172" one layer at a time, then the third segment 174" one layer at a time, and so on. The resulting electrode tip 132" may include a series of concentric circles or other shapes 170"-178" that are somewhat interfused with one another due to the additive manufacturing or 3D printing process. According to another possibility, the different concentric segments 170"-178" could be made from different materials (e.g., different precious metal-based powders) so that the resulting electrode tip 132" had a non-uniform composition that is customized for a particular application. If temperatures are typically hottest towards the center of the electrode tip 132", then the first segment 170" could have a higher percentage of platinum or iridium, for example, than the fourth segment 176" out towards the edge, so as to provide the center of the electrode tip with additional erosion and/or corrosion resistance. Of course, other methods could be used to build these and other embodiments instead.

Turning now to FIGS. 15 and 16, there are shown several known ground electrode assemblies that have a preformed precious metal-based electrode tip welded to a nickel-based electrode base (in this case, a side surface of the ground electrode). Starting with FIG. 15, a ground electrode assembly 200 includes an electrode tip 202 that is made from a precious metal-based material and is attached to a side surface of an electrode base 204 via a circumferential laser weld 206. In this case, the laser weld 206 was created by a laser L' that was accurately directed at the interface between the electrode tip 202 and the side surface of the electrode base 204, however, the laser L' did not penetrate deep enough into the work piece to create a weld or fused connection across the entire interface between the two components. An unfused area 208 remains towards the center of the interface such that the electrode tip 202 and the electrode base 204 are not fused or joined at this location. Thus, the electrode tip 202 is not connected to the electrode base 204 with a whole area connection.

In the FIG. 16 example, the ground electrode assembly 200' also has a preformed electrode tip 202' that is made from a precious-metal based material and is attached to a side surface of an electrode base 204'. In this case, the accuracy of the laser L' may be slightly off so that, instead of impinging the work piece directly at the interface or boundary between the electrode base 204' and tip 202', laser L' strikes the work piece slightly above this interface. Even though the laser weld 206' penetrates deep enough into the work piece, unlike the previous example, the laser L' inadvertently strikes the work piece slightly above the interface. The resulting weld 206' may result in different alloy formations than if the laser struck precisely at the interface, and under heavy thermal cycling in operation, this could result in the electrode tip becoming detached. The smaller the size of the laser focus or laser spot, generally the greater its energy density (this may cause the laser L' to penetrate deeper in the work piece to overcome the problem shown in FIG. 15). However, the smaller the size of the laser focus, the less room for error in terms of deviating from the interface (this increases the likelihood of the problem in FIG. 16). Automated optical detection and tracking tools for controlling the laser are possible, but their effectiveness can be negatively impacted by fluctuating work piece surfaces (e.g., reflections, changing ambient light, etc.) and other factors. The preceding examples represent just two possibilities of how an electrode tip 202, 202' may be improperly welded to an electrode base 204, 204' so that a whole area connection is not formed; these examples are not part of the electrode of the present application.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A spark plug electrode, comprising:
an electrode base;
an electrode tip that is formed on the electrode base and includes a precious metal-based material and a plurality of laser deposition layers, the laser deposition layers are stacked on one another; and
an intermediate layer that is located between the electrode base and the electrode tip, the intermediate layer has a coefficient of thermal expansion (CTE) that is between that of the electrode base and the electrode tip;
wherein the intermediate layer includes a whole area connection between the electrode base and the electrode tip, in the whole area connection at least some solidified material from the electrode base has intermixed and/or interfused with at least some solidified material from the electrode tip,
wherein the whole area connection is non-uniform in thickness so that it is thicker in one section than it is in another section,
wherein the whole area connection has a lenticular shape and includes a center section and a radially outboard section, the center section is thicker, in an axial dimension, than the radially outboard section and is located towards a center of the whole area connection,
wherein the whole area connection has an uneven shape and includes a first outboard section and a second outboard section, the first outboard section is located on a first side of the whole area connection and is thicker, in an axial dimension, than the second outboard section which is located on a second side of the whole area connection.

2. The spark plug electrode of claim 1, wherein the spark plug electrode is a center electrode and further comprises an electrode body, the electrode base is an integral part of the electrode body such that no hard boundary exists between the electrode base and the electrode body, the intermediate layer and the electrode tip are formed on the electrode base via additive manufacturing such that an interfused boundary exists between the electrode tip and the electrode base, and the spark plug electrode does not include a welded joint between substantially dissimilar materials.

3. The spark plug electrode of claim 1, wherein the spark plug electrode is a center electrode and further comprises an electrode body, the electrode base is a separate component from the electrode body and is welded to the electrode body such that a hard boundary exists between the electrode base and the electrode body, the intermediate layer and the electrode tip are formed on the electrode base via additive manufacturing such that an interfused boundary exists between the electrode tip and the electrode base, and the spark plug electrode does not include a welded joint between substantially dissimilar materials.

4. The spark plug electrode of claim 1, wherein the spark plug electrode is a ground electrode and further comprises an electrode body, the electrode base is an integral part of the electrode body such that no hard boundary exists between the electrode base and the electrode body, the intermediate layer and the electrode tip are formed on the electrode base via additive manufacturing such that an interfused boundary exists between the electrode tip and the electrode base, and the spark plug electrode does not include a welded joint between substantially dissimilar materials.

5. The spark plug electrode of claim 1, wherein the spark plug electrode is a ground electrode and further comprises an electrode body with a hole, the electrode base, the electrode tip and the intermediate layer are part of a pre-manufactured ground electrode tip assembly that is attached in the hole, the electrode base is a separate component from the electrode body and is welded to the electrode body such that a hard boundary exists between electrode base and the electrode body, the intermediate layer and the electrode tip are formed on the electrode base via additive manufacturing such that an interfused boundary exists between the electrode tip and the electrode base, and the spark plug electrode does not include a welded joint between substantially dissimilar materials.

6. The spark plug electrode of claim 1, wherein the precious metal-based material is selected from the group consisting of: an iridium-based material with a coefficient of thermal expansion that is between $6 \times 10^{-6}$ m/mK and $7 \times 10^{-6}$ m/mK and a melting temperature that is between 2,400° C. and 2,500° C. or a platinum-based material with a coefficient of thermal expansion that is between $8 \times 10^{-6}$ m/mK and $10 \times 10^{-6}$ m/mK and a melting temperature that is between 1,700° C. and 1,800° C.

7. The spark plug electrode of claim 1, wherein the plurality of laser deposition layers have an average layer thickness Y that is between 20 μm and 100 μm and the electrode tip has an electrode tip height X that is between 0.1 mm and 1.0 mm.

8. The spark plug electrode of claim 1, wherein the electrode tip includes a plurality of valleys and a plurality of peaks located at one or more interfused boundaries between laser deposition layers.

9. The spark plug electrode of claim 8, wherein an average inter-layer surface area of the interfused boundaries having the plurality of valleys and the plurality of peaks is greater than or equal to 1.8× a corresponding surface area of the electrode base, if the electrode base was perfectly flat.

10. The spark plug electrode of claim 1, wherein the whole area connection at least covers most of an area or footprint where the electrode tip connects to the electrode base.

11. The spark plug electrode of claim 1, wherein the intermediate layer and the electrode tip are formed by additive manufacturing, which uses a powder bed fusion technique to melt or sinter precious metal-based powder onto the electrode base with a laser or electron beam, and then to allow the melted or sintered powder to solidify.

12. A spark plug, comprising:
- a shell having an axial bore;
- an insulator being at least partially located in the shell axial bore and having an axial bore;
- a center electrode being at least partially located in the insulator axial bore; and
- a ground electrode attached to the shell;
- wherein at least one of the center electrode or the ground electrode includes the spark plug electrode of claim 1.

13. A spark plug electrode, comprising:
- an electrode base;
- an electrode tip that is formed on the electrode base and includes a precious metal-based material and a plurality of laser deposition layers, the laser deposition layers are stacked on one another; and
- an intermediate layer that is located between the electrode base and the electrode tip, the intermediate layer has a coefficient of thermal expansion (CTE) that is between that of the electrode base and the electrode tip,
- wherein the electrode tip includes at least a first segment and a second segment, the first segment is located towards a center of the electrode tip and includes a first plurality of laser deposition layers, the second segment is located radially outboard of the first segment and includes a second plurality of laser deposition layers, the second segment is concentric with the first segment.

14. The spark plug electrode of claim 13, wherein the first segment located towards the center of the electrode tip includes a first precious metal-based material and the second segment located radially outboard of the first segment includes a second precious metal-based material, the first precious metal-based material is different than the second precious metal-based material.

\* \* \* \* \*